United States Patent [19]

Rosaen

[11] Patent Number: 4,498,497
[45] Date of Patent: Feb. 12, 1985

[54] FLOW METER BYPASS VALVE ASSEMBLY

[75] Inventor: Lars O. Rosaen, Plymouth, Mich.

[73] Assignee: Universal Filters, Inc., Hazel Park, Mich.

[21] Appl. No.: 398,878

[22] Filed: Jul. 16, 1982

[51] Int. Cl.³ .............................................. F16K 17/04
[52] U.S. Cl. .................. 137/599.1; 73/199; 137/536; 137/538
[58] Field of Search .................. 73/199; 137/536, 538, 137/599.1; 210/130, 133

[56] References Cited

U.S. PATENT DOCUMENTS

| | | | |
|---|---|---|---|
| 488,370 | 12/1892 | Schenck | 137/536 X |
| 1,307,337 | 6/1919 | Bassett | 137/599.1 X |
| 1,609,954 | 12/1926 | McGrew | 137/538 |
| 2,295,154 | 9/1942 | Brower | 137/536 X |
| 2,387,805 | 10/1945 | Olsen | 73/199 X |
| 3,068,894 | 12/1962 | Bunting | 137/538 X |
| 3,460,805 | 8/1969 | Kudlaty | 210/133 X |
| 3,814,251 | 6/1974 | Aspinwall | 210/133 X |

Primary Examiner—Robert G. Nilson
Attorney, Agent, or Firm—Gifford, VanOphem, Sheridan, Sprinkle & Nabozny

[57] ABSTRACT

A bypass valve assembly is disclosed for use with a fluid flow meter of the type having a housing, an inlet, an outlet, a fluid passage which fluidly connects the inlet to the outlet and a flow rate responsive member within the fluid passage. The bypass valve assembly comprises a tubular body open at one end in which is secured to the flow meter housing so that the open end of the tube registers with the flow meter inlet. A valve member is contained within the tube and is urged to a closed position by a helical spring. In its closed position, the valve member directs all of the influent to the flow meter through the passage. When the fluid flow rate into the flow meter exceeds a predetermined amount, the valve member moves to an open position against the force of the helical spring thus bypassing the influent directly to the flow meter outlet.

4 Claims, 4 Drawing Figures

FLOW METER BYPASS VALVE ASSEMBLY

BACKGROUND OF THE INVENTION

I. Field of the Invention

The present invention relates generally to valve assemblies and, more particularly, to a bypass valve assembly for a fluid flow meter.

II. Description of the Prior Art

There are a number of different types of fluid flow meters. In general, however, fluid flow meters comprise a housing having an inlet, an outlet and a fluid passage formed through the housing for fluidly connecting the inlet to the outlet. A flow responsive member is mounted within the housing in series with the fluid passage so that the position of the flow responsive member varies in accordance with the fluid flow rate through the flow meter. Indicator means provide an external signal of the position of the flow response member and thus of the fluid flow rate.

Flow meters are conventionally designed to operate over a predetermined range of fluid flow rates. Furthermore, if the maximum fluid flow rate for the flow meter is exceeded, particularly by a large amount, the flow meter is oftentimes damaged thus requiring expensive repair and/or replacement.

For many applications, however, the user of the flow meter is desirous only of determining when the fluid flow rate falls below a predetermined and relatively low flow rate. Such low flow rates are typically indicative of a clogged system or other malfunction of the fluid system. At the same time, however, the flow meter must be capable of operating under relatively high fluid flow rates without damaging the flow meter although the actual flow rate above the predetermined minimum flow rate is unimportant.

For such fluid applications, the use of a flow meter having a relatively high fluid flow range has not proven wholly satisfactory. First, flow meters with high flow ranges are relatively expensive in construction and thus uneconomical for the user who desires to determine only when the flow rate falls below a predetermined minimum amount. Secondly, the accuracy of many flow meters decreases proportionately with the range of fluid flow rates of the flow meter. Thus, a flow meter with a very high flow range is incapable of accurately measuring relatively low fluid flow rates.

SUMMARY OF THE PRESENT INVENTION

The present invention provides a bypass valve assembly which overcomes all of the above mentioned disadvantages.

In brief, the bypass valve assembly of the present invention is designed for use with a conventional fluid flow meter. Such a fluid flow meter comprises a housing having an inlet, an outlet and a fluid passage formed through the housing for fluidly connecting the inlet to the outlet. A flow responsive member is positioned within the fluid passage and the position of the flow responsive member varies in dependence upon the fluid flow rate through the flow meter passage. An indicator provides an external signal of the position of the flow responsive member and thus of the fluid flow rate.

In the preferred form of the invention, the bypass valve assembly of the present invention comprises a tube open at one end and which is secured to the housing so that the open end of the tube is aligned with and open to the flow meter inlet. Consequently, influent to the flow meter inlet would normally pass into the interior of the tube. At least one and preferably a plurality of radial ports are formed through the tube at a position spaced from its open end and these radial ports intersect and are open to the interior of the tube. In addition, these radial ports are in fluid communication with the flow meter passage at a position between the flow responsive member and the flow meter outlet.

A valve member is longitudinally slidably mounted within the interior of the tube. The valve member is normally urged towards a closed position by a spring wherein the valve member extends across the interior of the tube in between the radial ports and open end of the tube. Consequently, in its closed position, the valve member prevents fluid flow through the tube and instead directs the influent to the flow meter inlet through the flow meter passage. When the valve member is in its closed position, the flow meter operates in its normal fashion and the true fluid flow rate through the fluid meter is displayed by the flow meter indicator means.

When the flow rate of the influent exceeds a predetermined amount, the valve member compresses against the force of the spring thus establishing fluid communication from the open end of the tube and to the radial ports. In doing so, a portion of the influent bypasses directly from the flow meter inlet and to the flow meter outlet. The valve member will remain in its open position as long as the flow rate to the flow meter inlet exceeds the predetermined flow rate amount.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
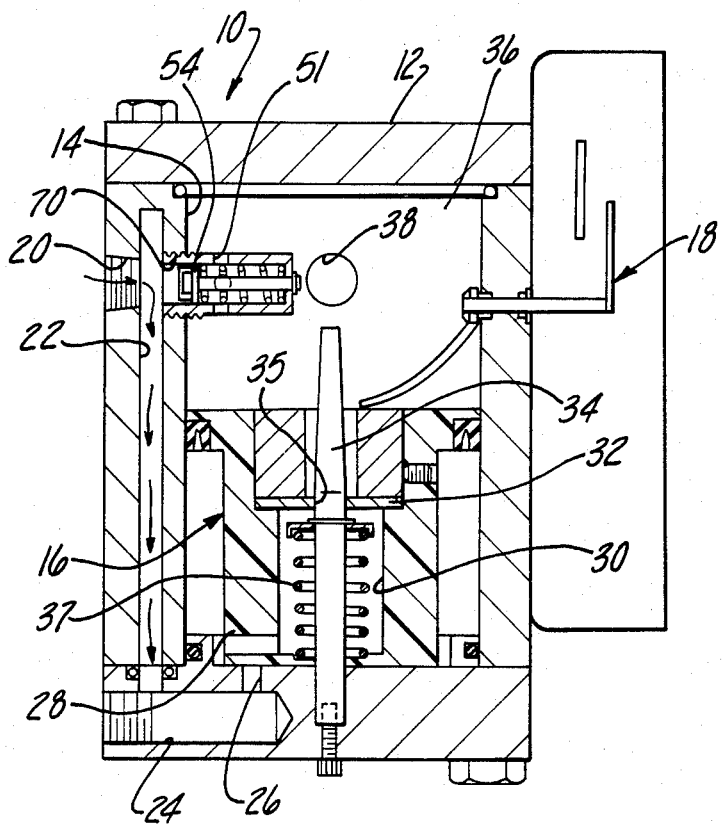
FIG. 1 is a sectional view illustrating a flow meter utilizing a preferred embodiment of the bypass valve assembly of the present invention.

With reference first to FIG. 1, a flow meter 10 is thereshown having a housing 12 which defines an interior cylindrical chamber 14. A flow responsive member 16, such as a piston, is longitudinally slidably mounted within the chamber 14 while indicating means 18 provide an exteriorly visible signal of the axial position of the flow responsive member 16 within the chamber 14.

An inlet 20 on the housing 12 fluidly communicates through passgeways 22, 24 and 26 to one side of the flow responsive member 16. The flow responsive member 16 includes a radial passageway 28 and an interior bore 30 which, together, establish fluid communication from the passageway 26 and to a ported plate 32 carried by the flow responsive member 16.

The ported plate 32 cooperates with a tapered rod 34 to form an opening 35 between the interior bore 30 of the flow responsive member 16 and an upper subchamber 36 formed above the member 16. The area of the opening 35 varies with the axial position of the flow responsive member 16 and a spring 37 urges the member 16 in the direction opposite from the fluid flow through the opening 35. An outlet 38 on the flow meter housing 12 is open to the subchamber 36.

The flow meter passageways 22, 24 and 26 together with the cross passage 28, bore 30 and opening 35 form a fluid passage for fluidly connecting the flow meter inlet 20 to the outlet 38. Consequently, the flow responsive member 16 is fluidly mounted in series with the fluid passage means so that fluid flow from the inlet 20 and to the outlet 38 normally flows through the bore 30 of the flow responsive member 16 and through the opening 35. The position of the flow responsive member 16 within the housing chamber 14 is thus indicative of the flow rate through the flow meter 10 and this flow is displayed exteriorly of the flow meter housing 12 by the indicator means 18.

The foregoing description of the flow meter 10 is by way of example only and is presented only for clarity and completeness. As will become shortly apparent, the bypass valve assembly according to the present invention can be used with flow meter of different constructions and utilizing different types of flow responsive members.

Figure 2:
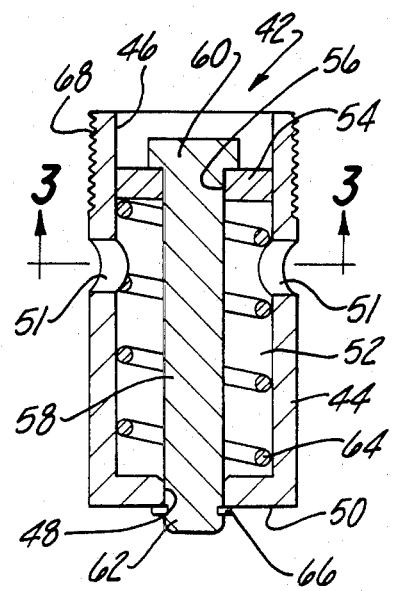
FIG. 2 is a cross sectional view of the preferred embodiment of the bypass valve assembly and enlarged for clarity.
Figure 3:
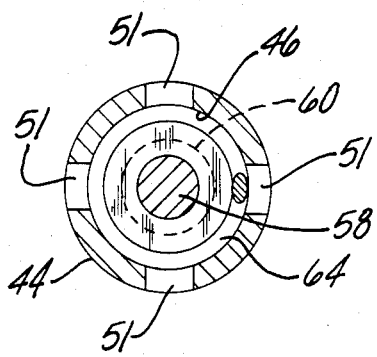
FIG. 3 is a cross sectional view taken substantially along line 3—3 in FIG. 2.

With reference now to FIG. 2, a preferred embodiment of the bypass valve assembly 42 of the present invention is thereshown and comprises a body 44 which is tubular and cylindrical in shape. The body 44 is open at one end 46 and has an axial bore 48 formed through its other end 50. The body 44 thus forms an interior cylindrical chamber 52 and a plurality of circumferentially spaced radial ports 51 are formed through the body 44 and open to the chamber 52 at a position axially spaced from the open end 46 of the body 44.

A disc shaped valve member 54 having an axial throughbore 56 is axially slidably mounted within the body chamber 52. The outside diameter of the valve member 54 is substantially the same or slightly less than the diameter of the body chamber 52 so that the valve member 54 extends substantially entirely across the body chamber 52.

An elongated cylindrical rod 58 having an enlarged head 60 at one end is inserted through the valve member bore 56 and the bore 48 at the end 50 of the body 44 so that the enlarged head 60 is positioned between the valve member 54 and the open end 46 of the body 44. The rod 58 is dimensioned so that, with the valve member 54 positioned in between the open end 46 of the body 44 and the radial ports 51, a portion 62 of the rod 58 extends outwardly from the end 50 of the body 44. A compression spring 64 is contained within the body chamber 52 in between the valve member 54 and the end 50 of the body 44 and urges the valve member 54 toward the open end 46 of the body 44. A retainer 66 is secured to the rod portion 62 to limit the travel of the valve member 54 to a position in between the ports 51 and open end 46 of the body 44.

With reference now to FIGS. 1 and 2, the body 44 includes an externally threaded portion 68 adjacent the open end 46 of the body 44. This threaded portion 68 threadably cooperates with an internally threaded bore 70 (FIG. 1) in the flow meter housing 12 and the bore 70 is both fluidly open to and aligned with the flow meter inlet 20. With the bypass valve assembly 42 secured to the flow meter housing 12 as shown in FIG. 1, the influent to the flow meter inlet 20 will impact upon the valve member 54. At the same time, the radial ports 51 are open to the subchamber 36 and thus open to the flow meter fluid passage at a position in between the flow responsive member 16 and the outlet 38. Furthermore, with the bypass valve assembly 42 secured to the flow meter housing 12, the bypass valve assembly chamber 52 forms a passageway with the open end 46 of the chamber 52 forming an inlet end of the passageway and the radial ports 51 forming an outlet end of the passageway.

With reference to FIG. 1, in operation and during relatively low fluid flow rates into the housing inlet 20, the compression spring 64 maintains the valve member 54 in a closed position, i.e., between the open end 46 of the body 44 and the radial ports 51. In its closed position, the valve member 54 prevents fluid flow through the bypass valve assembly 42 so that all of fluid flow into the housing inlet 20 passes through the flow meter passage 22. In doing so, the fluid flow axially displaces the flow responsive member 16 which in turn actuates the indicator means 18 to display true fluid flow rate through the flow meter 10.

Figure 4:
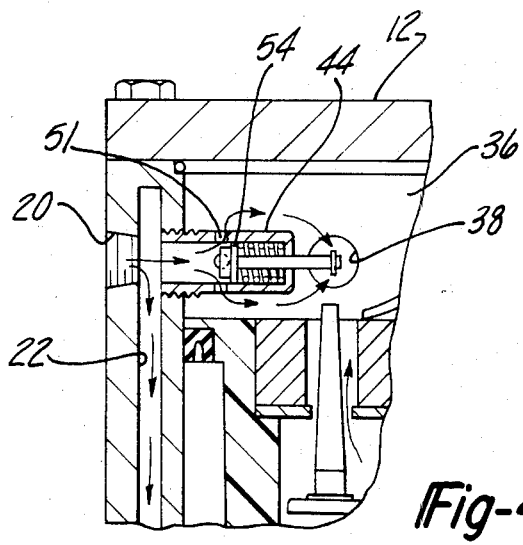
FIG. 4 is a partial sectional view similar to FIG. 1 but illustrating the bypass valve assembly in its open position.

With reference now to FIG. 4, when the fluid flow rate of the influent to the flow meter 10 exceeds a predetermined rate, as determined by the helical spring 37, the bypass valve member 54 retracts within the body chamber 52 to its open position. In its open position, the valve member 54 uncovers the radial ports 51 thus establishing fluid communication between the open end 46 of the body 44 and the radial ports 51. In its open position, the bypass valve assembly 42 fluidly connects the flow meter inlet 20 to the flow meter outlet 38 thus bypassing flow responsive member 16. During the bypassing condition, the flow rate indicated by the indicator means 18 will not be accurate. However, for many flow meter applications, the user is desirous only of detecting when the flow rate falls below a predetermined rate while the actual measurement of the flow rate above that predetermined rate is unimportant.

Having described my invention, however, many modifications thereto will become apparent to those skilled in the art to which it pertains without deviation from the spirit of the invention as defined by the scope of the appended claims.

I claim:

1. In a fluid flow meter having a housing, a meter inlet, a meter outlet, fluid passage means formed in said housing for fluidly connecting said meter inlet to said meter outlet, and a flow rate responsive member contained in said fluid passage means, the improvement therein comprising, an elongated valve body having an elongated axial bore, a fluid passageway formed in said body, said fluid passageway having an inlet end and an outlet end, said axial bore forming a portion of said fluid passageway, means for detachably threadably securing said body to said housing so that said axial bore in said valve body is axially aligned with said flow meter inlet and so that said fluid passageway inlet end is open to said flow meter inlet and said fluid passageway outlet end is open directly to said meter outlet whereby said fluid passageway bypasses said flow rate responsive member, a valve member carried within said body and axially movable within said valve body bore between an open position in which said valve member establishes fluid communication between the ends of said fluid passageway and a closed position in which said valve member prevents fluid flow between said ends of said passageway, said valve member including an impingement surface adjacent the inlet end of said fluid passageway when said valve member is in said closed position and said impingement surface facing said meter inlet, means for moving said valve member to said closed position when fluid flow into said flow meter inlet is less than a predetermined rate;

wherein said fluid passage means comprises an inlet fluid passage formed in said housing and extending substantially perpendicular to said meter inlet, wherein said impingement surface is disposed closely adjacent said flow meter inlet; and wherein said impingement surface has a cross-sectional area substantially the same as that of said meter inlet so that influent through said meter inlet directly and perpendicularly impinges upon said impingement surface of said valve member and causes movement of said valve member in response to the rate of said influent flow.

2. The invention as defined in claim 1 wherein said fluid passageway comprises at least one radial port formed through said valve member body.

3. The invention as defined in claim 1 and comprising an elongated rod secured at one end to said valve member and having its other end slidably mounted in a bore at an end of said valve member body most spaced from said meter inlet.

4. The invention as defined in claim 3 wherein said moving means comprises a compression spring entrapped between said valve member and the end of said body most spaced from said meter inlet.

* * * * *